(12) United States Patent
Mezger et al.

(10) Patent No.: US 11,078,418 B2
(45) Date of Patent: *Aug. 3, 2021

(54) CORROSION INHIBITORS FOR FUELS AND LUBRICANTS

(71) Applicant: BASF SE, Ludwigshafen am Rhein (DE)

(72) Inventors: Jochen Mezger, Ludwigshafen (DE); Szilard Csihony, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 172 days.

This patent is subject to a terminal disclaimer.

(21) Appl. No.: 16/313,751

(22) PCT Filed: Jun. 27, 2017

(86) PCT No.: PCT/EP2017/065751
§ 371 (c)(1),
(2) Date: Dec. 27, 2018

(87) PCT Pub. No.: WO2018/007191
PCT Pub. Date: Jan. 11, 2018

(65) Prior Publication Data
US 2020/0308486 A1 Oct. 1, 2020

(30) Foreign Application Priority Data
Jul. 5, 2016 (EP) .................... 16177922

(51) Int. Cl.
*C09K 15/06* (2006.01)
*C08F 8/46* (2006.01)
(Continued)

(52) U.S. Cl.
CPC ............... *C09K 15/06* (2013.01); *C08F 8/46* (2013.01); *C10L 1/195* (2013.01); *C10L 10/04* (2013.01);
(Continued)

(58) Field of Classification Search
CPC ............. C10M 133/56; C10M 133/54; C10M 129/93; C10M 133/04; C10M 159/12;
(Continued)

(56) References Cited

U.S. PATENT DOCUMENTS 3,275,554 A 9/1966 Wagenaar
3,382,056 A 5/1968 Mehmedbasich
(Continued)

FOREIGN PATENT DOCUMENTS

CA 2 803 207 12/2011
CN 102382695 3/2012
(Continued)

OTHER PUBLICATIONS

Extended European Search Report dated Oct. 14, 2016 in European Patent Application No. 16177922.8 (with English translation of Category of Cited Documents), 4 pages.
(Continued)

*Primary Examiner* — Vishal V Vasisth
(74) *Attorney, Agent, or Firm* — Grüneberg and Myers PLLC (57) ABSTRACT

The present invention relates to novel uses of corrosion inhibitors in fuels and lubricants.

18 Claims, 1 Drawing Sheet

(51) Int. Cl.
*C10L 1/195* (2006.01)
*C10L 10/04* (2006.01)
*C10M 145/16* (2006.01)
*C10N 20/04* (2006.01)
*C10N 30/12* (2006.01)

(52) U.S. Cl.
CPC ... *C10M 145/16* (2013.01); *C10L 2200/0423* (2013.01); *C10L 2250/04* (2013.01); *C10L 2270/023* (2013.01); *C10M 2209/086* (2013.01); *C10N 2020/04* (2013.01); *C10N 2030/12* (2013.01)

(58) Field of Classification Search
CPC ............. C10M 143/06; C10M 129/95; C10M 133/16; C10M 129/68; C10M 2215/28; C10M 2215/26; C10M 2215/02; C10M 2207/34; C10M 2215/086; C10M 2207/129; C10M 2215/08; C10L 10/04; C10L 1/198; C10L 2200/0423; C10N 2030/12
See application file for complete search history.

(56) References Cited

U.S. PATENT DOCUMENTS

| | | |
|---|---|---|
| 3,413,104 A | 11/1968 | Mehmedbasich |
| 3,438,757 A | 4/1969 | Honnen et al. |
| 3,454,555 A | 7/1969 | Van de Voort et al. |
| 3,565,804 A | 2/1971 | Honnen et al. |
| 3,755,433 A | 8/1973 | Miller et al. |
| 3,822,289 A | 7/1974 | Clark et al. |
| 3,909,215 A | 9/1975 | Kray |
| 4,171,959 A | 10/1979 | Vartanian |
| 4,248,719 A | 2/1981 | Chafetz et al. |
| 4,491,455 A | 1/1985 | Ishizaki et al. |
| 4,599,433 A | 7/1986 | Bronstert et al. |
| 4,655,946 A | 4/1987 | Metro et al. |
| 4,832,702 A | 5/1989 | Kummer et al. |
| 4,877,416 A | 10/1989 | Campbell |
| 4,919,757 A | 4/1990 | Ohmae et al. |
| 4,933,098 A | 6/1990 | Gutierrez et al. |
| 4,959,077 A | 9/1990 | Martischius et al. |
| 4,980,238 A | 12/1990 | Ohmae et al. |
| 4,997,895 A | 3/1991 | Ohmae et al. |
| 5,071,919 A | 12/1991 | Degonia et al. |
| 5,080,686 A | 1/1992 | Garrecht et al. |
| 5,112,364 A | 5/1992 | Rath et al. |
| 5,214,224 A | 5/1993 | Comer et al. |
| 5,229,022 A | 7/1993 | Song et al. |
| 5,232,963 A | 8/1993 | Comer et al. |
| 5,298,039 A | 3/1994 | Mohr et al. |
| 5,332,491 A | 7/1994 | Fisher et al. |
| 5,350,429 A | 9/1994 | Mohr et al. |
| 5,422,023 A | 6/1995 | Francisco |
| 5,492,641 A | 2/1996 | Mohr et al. |
| 5,496,383 A | 3/1996 | Franz et al. |
| 5,567,845 A | 10/1996 | Franz et al. |
| 5,660,601 A | 8/1997 | Oppenländer et al. |
| 5,670,462 A | 9/1997 | Barr et al. |
| 5,766,273 A | 6/1998 | Dralle-Voss et al. |
| 5,883,196 A | 3/1999 | Rath et al. |
| 6,267,791 B1 | 7/2001 | Thomas et al. |
| 6,371,999 B1 | 4/2002 | Mohr et al. |
| 6,395,852 B1 | 5/2002 | Faul et al. |
| 6,610,797 B1 | 8/2003 | Deckers et al. |
| 6,743,266 B2 | 6/2004 | Derosa et al. |
| 9,481,742 B2 | 11/2016 | Schade et al. |
| 9,914,792 B2 | 3/2018 | Voellmar et al. |
| 10,150,927 B2 | 12/2018 | Mezger et al. |
| 10,173,963 B2 | 1/2019 | Hansch et al. |
| 10,240,100 B2 | 3/2019 | Mezger et al. |
| 10,370,610 B2 | 8/2019 | Hansch et al. |
| 10,407,634 B2 | 9/2019 | Hansch et al. |
| 10,557,096 B2 | 2/2020 | Troetsch-Schaller et al. |
| 10,689,326 B2 | 6/2020 | Hansch et al. |
| 10,781,385 B2 | 9/2020 | Garcia Castro et al. |
| 10,844,308 B2 | 11/2020 | Mezger et al. |
| 10,947,467 B2 | 3/2021 | Peretolchin et al. |
| 2002/0091068 A1 | 7/2002 | Loper |
| 2004/0182743 A1 | 9/2004 | MacMillan |
| 2006/0196110 A1 | 9/2006 | Schwahn et al. |
| 2007/0094918 A1 | 5/2007 | Sawhney et al. |
| 2008/0113890 A1 | 5/2008 | Moreton et al. |
| 2008/0319240 A1 | 12/2008 | Stark et al. |
| 2011/0271926 A1 | 11/2011 | Cracknell et al. |
| 2011/0315107 A1 | 12/2011 | Grabarse et al. |
| 2012/0031810 A1 | 2/2012 | Stark et al. |
| 2013/0087480 A1 | 4/2013 | Stark et al. |
| 2013/0133243 A1 | 5/2013 | Röger-Göpfert et al. |
| 2013/0227878 A1 | 9/2013 | Wolf et al. |
| 2013/0239465 A1 | 9/2013 | Morgan et al. |
| 2014/0051615 A1 | 2/2014 | Salomon et al. |
| 2014/0113847 A1 | 4/2014 | Givens et al. |
| 2014/0187457 A1 | 7/2014 | Kanga et al. |
| 2015/0096516 A1 | 4/2015 | Fang et al. |
| 2015/0240183 A1 | 8/2015 | Knapton |
| 2015/0266808 A1 | 9/2015 | Hansch et al. |
| 2016/0075801 A1 | 3/2016 | Schade et al. |
| 2016/0130514 A1* | 5/2016 | Hansch .................. C10L 1/222 508/547 |
| 2016/0272911 A1 | 9/2016 | Hansch et al. |
| 2017/0037336 A1 | 2/2017 | Mezger et al. |
| 2017/0066986 A1 | 3/2017 | Mezger et al. |
| 2017/0130153 A1 | 5/2017 | Peretolchin et al. |
| 2017/0137740 A1 | 5/2017 | Barton et al. |
| 2017/0183590 A1 | 6/2017 | Mezger et al. |
| 2017/0335033 A1 | 11/2017 | Voellmar et al. |
| 2017/0342340 A1 | 11/2017 | Hansch et al. |
| 2017/0355916 A1 | 12/2017 | Troetsch-Schaller et al. |
| 2018/0182506 A1 | 6/2018 | Gao et al. |
| 2018/0201855 A1 | 7/2018 | Garcia Castro et al. |
| 2018/0201863 A1 | 7/2018 | Mezger et al. |
| 2018/0251692 A1 | 9/2018 | Mezger et al. |
| 2018/0355266 A1 | 12/2018 | Garcia Castro et al. |
| 2019/0016987 A1 | 1/2019 | Csihony et al. |
| 2019/0084922 A1 | 3/2019 | Hansch et al. |
| 2019/0218471 A1 | 7/2019 | Mezger et al. |
| 2019/0249099 A1 | 8/2019 | Peretolchin et al. |
| 2020/0056109 A1 | 2/2020 | Peretolchin et al. |
| 2020/0308501 A1 | 10/2020 | Troetsch-Schaller et al. |

FOREIGN PATENT DOCUMENTS

| | | |
|---|---|---|
| CN | 102958949 | 3/2013 |
| CN | 104513678 | 4/2015 |
| DE | 37 30 885 | 3/1989 |
| DE | 37 33 172 | 4/1989 |
| DE | 38 26 608 | 2/1990 |
| DE | 38 38 918 A1 | 5/1990 |
| DE | 41 42 241 | 6/1993 |
| DE | 43 09 074 | 9/1994 |
| DE | 43 19 672 | 12/1994 |
| DE | 43 25 237 | 2/1995 |
| DE | 196 20 262 A1 | 11/1997 |
| DE | 101 02 913 | 7/2002 |
| DE | 101 02 913 A1 | 7/2002 |
| DE | 102 43 361 | 4/2004 |
| EP | 0 061 895 A2 | 10/1982 |
| EP | 0 156 310 | 10/1985 |
| EP | 0 235 868 A1 | 9/1987 |
| EP | 0 244 616 | 11/1987 |
| EP | 0 261 957 A2 | 3/1988 |
| EP | 0 299 120 | 1/1989 |
| EP | 0 307 815 | 3/1989 |
| EP | 0 307 815 A1 | 3/1989 |
| EP | 0 310 875 | 4/1989 |
| EP | 0 315 718 | 5/1989 |
| EP | 0 356 725 | 3/1990 |
| EP | 0 452 328 | 10/1991 |
| EP | 0 457 599 A2 | 11/1991 |
| EP | 0 476 485 | 3/1992 |
| EP | 0 548 617 | 6/1993 |

(56) References Cited

FOREIGN PATENT DOCUMENTS

| | | |
|---|---|---|
| EP | 0 639 632 | 2/1995 |
| EP | 0 700 985 | 3/1996 |
| EP | 0 700 985 A1 | 3/1996 |
| EP | 0 831 141 A1 | 3/1998 |
| EP | 1 151 994 | 11/2001 |
| EP | 1 746 147 | 1/2007 |
| EP | 2 033 945 | 3/2009 |
| GB | 2496514 | 5/2013 |
| JP | 55-85679 | 6/1980 |
| JP | 59-100196 | 6/1984 |
| JP | 63-125599 | 5/1988 |
| JP | 8-295891 | 11/1996 |
| JP | 2007-77216 | 3/2007 |
| RU | 2005 134 823 | 6/2006 |
| WO | 87/01126 | 2/1987 |
| WO | WO 91/03529 A1 | 3/1991 |
| WO | WO 93/18115 A1 | 9/1993 |
| WO | WO 94/24231 A1 | 10/1994 |
| WO | 96/03367 A1 | 2/1996 |
| WO | 96/03479 A1 | 2/1996 |
| WO | 96/28486 | 9/1996 |
| WO | WO 97/03946 A1 | 2/1997 |
| WO | WO 98/04656 A1 | 2/1998 |
| WO | 99/29748 | 6/1999 |
| WO | WO 00/44857 A2 | 8/2000 |
| WO | WO 00/47698 A1 | 8/2000 |
| WO | WO 2004/024850 A1 | 3/2004 |
| WO | WO 2004/035715 A1 | 4/2004 |
| WO | 2004/090079 | 10/2004 |
| WO | WO 2005/054314 A2 | 6/2005 |
| WO | 2006/135881 | 12/2006 |
| WO | 2007/042887 | 4/2007 |
| WO | 2008/060888 | 5/2008 |
| WO | 2008/138836 | 11/2008 |
| WO | 2009/124979 | 10/2009 |
| WO | WO 2010/042378 A1 | 4/2010 |
| WO | 2010/132259 | 11/2010 |
| WO | 2011/095819 | 8/2011 |
| WO | 2011/110860 | 9/2011 |
| WO | 2011/134923 | 11/2011 |
| WO | 2011/146289 | 11/2011 |
| WO | 2011/153178 | 12/2011 |
| WO | 2011/161149 | 12/2011 |
| WO | 2012/004300 | 1/2012 |
| WO | 2012/087781 | 6/2012 |
| WO | 2013/000997 | 1/2013 |
| WO | 2013/064689 | 5/2013 |
| WO | 2013/070503 | 5/2013 |
| WO | 2013/101256 | 7/2013 |
| WO | 2014/195464 | 12/2014 |
| WO | 2015/113681 | 8/2015 |
| WO | 2015/114029 | 8/2015 |
| WO | 2016/083130 | 6/2016 |
| WO | 2018/114348 | 6/2018 |

OTHER PUBLICATIONS

International Search Report dated Jul. 25, 2017 in PCT/EP2017/065751 filed Jun. 27, 2017.
U.S. Appl. No. 15/744,162, filed Jan. 12, 2018, US 2018-0251692 A1, Mezger, J., et al.
U.S. Appl. No. 15/115,594, filed Jul. 29, 2016, US 2017-0183590 A1, Mezger, J., et al.
U.S. Appl. No. 15/743,897, filed Jan. 11, 2018, US 2018-0201863 A1, Mezger, J., et al.
U.S. Appl. No. 16/069,583, filed Jul. 12, 2018, US 2019-0016987 A1, Csihony, S., et al.
U.S. Appl. No. 15/736,013, filed Dec. 13, 2017, US 2018-0182506 A1, Gao, X., et al.
U.S. Appl. No. 15/744,416, filed Jan. 12, 2018, US 2018-0201855 A1, Garcia Castro, I., et al.
U.S. Appl. No. 16/307,796, filed Dec. 6, 2018, Mezger, J., et al.
Chinese Office Action dated Nov. 16, 2017 in Chinese Patent Application No. 201480077527.2, English Translation only, 8 pages.
Database WPI Week, vol. 1988, No. 27, Thomson Scientific, London, Publisher accession No. XP002750507, May 1988, pp. 1988-187412.
European Search Report dated Mar. 30, 2017 in European Patent Application No. 16178310.5, 3 pages.
European Search Report dated Jan. 29, 2016 in Patent Application No. 15177078.1, 4 pages.
European Search Report dated Feb. 5, 2016 in European Patent Application No. 15177085.6, 4 pages.
International Preliminary Report on Patentability and Written Opinion dated Aug. 4, 2016 in PCT/EP2014/076622, 24 pages including English Translation.
International Search Report dated Mar. 18, 2015 in PCT/EP2015/051752, 8 Pages including English Translation.
International Search Report dated Mar. 26, 2015 in PCT/EP2014/076622, 11 Pages including English Translation.
International Search Report dated Sep. 13, 2016 in PCT/EP2016/066465, 7 pages including English Translation.
International Search Report dated Oct. 19, 2016, in PCT/EP2016/066466, 9 Pages with English Translation.
International Search Report dated Aug. 14, 2017 in PCT/EP2017/065752, 7 Pages with English Translation.
International Search Report dated Sep. 25, 2017 in PCT/EP2017/066619, 7 pages with English Translation.
Müller, et al., "*Polymeric Corrosion Inhibitors for Copper and Brass Pigments*" Journal of Applied Polymer Science, 2001, vol. 80, pp. 475-483.
Office Action dated Oct. 31, 2018 in Chinese Patent Application No. 201580012804.6 with English translation.
Office Action dated Oct. 8, 2019 in Chinese Patent Application No. 201680041540.1.

* cited by examiner

CORROSION INHIBITORS FOR FUELS AND LUBRICANTS

This application is a 371 of PCT/EP2017/065751, filed Jun. 27, 2017.

The present invention relates to novel uses of corrosion inhibitors in fuels and lubricants.

Corrosion inhibitors are standard additives in fuels and lubricants, which are often based on structures containing acid groups, for example dimer fatty acids.

A disadvantage of these corrosion inhibitors is that they have a tendency to precipitate, especially in the presence of calcium ions, as a result of which their corrosion-inhibiting action is reduced. The deposits formed as a result of this precipitation can additionally impair the working of engines, engine constituents or parts of the fuel system, especially the injection system, specifically the injection pumps or nozzles.

The "injection system" is understood to mean the part of the fuel system in motor vehicles from the fuel pump up to and including the injector outlet. "Fuel system" is understood to mean the components of motor vehicles that are in contact with the particular fuel, preferably the region from the tank up to and including the injector outlet.

In one embodiment of the present invention, the inventive compounds counteract deposits not just in the injection system but also in the rest of the fuel system, here especially deposits in fuel filters and pumps.

The problem addressed was therefore that of providing corrosion inhibitors which exhibit increased compatibility with calcium ions and at the same time retain their action as a corrosion inhibitor.

The problem is solved by the use according to the claims.

WO 2010/042378 A1 discloses the use of hydrolyzed and unhydrolyzed hydrocarbylsuccinic acids to counter metal pickup.

WO 2004/024850 A1 describes the preparation of polyisobutenesuccinic acid and the anhydride thereof, and the anticorrosive action thereof.

EP 235868 A1 explicitly describes an anticorrosive effect of the Diels-Alder adduct of polyisobutylene and maleic anhydride on steel, aluminum and brass.

U.S. Pat. No. 4,655,946 describes an anticorrosive effect of reaction products of polyisobutenesuccinic acids with amines.

None of these documents describes multiple adducts of maleic anhydride onto polyisobutene or recognizes the advantageous effect thereof as corrosion inhibitor. Moreover, the sensitivity of the corrosion inhibitors to metal salts is not recognized and solved.

Accordingly, the invention provides for the use of reaction products of polyisobutene that bear free acid groups, obtainable, preferably obtained, by reacting polyisobutene (A) having a number-average molecular weight Mn of 200 to 10 000 with at least one α,β-unsaturated mono- or dicarboxylic acid or their derivatives selected from the group consisting of monoalkyl esters, dialkyl esters and anhydrides (B), in a stoichiometric ratio of more than one equivalent of α,β-unsaturated mono- or dicarboxylic acid or their derivatives (B) per reactive double bond in the polyisobutene (A), with the proviso that in the case of use of monoalkyl esters and/or dialkyl esters as compound (B) at least 10% of the ester groups present are present in hydrolyzed form and/or in the case of use of anhydrides as compound (B) at least 10% of the anhydride groups present are present in hydrolyzed form, as corrosion inhibitors in fuels or lubricants, preferably in fuels, more preferably in fuels having a content of alkali metals and/or alkaline earth metals and/or zinc of at least 0.1 ppm by weight.

DETAILED DESCRIPTION OF THE INVENTION

The described reaction products of polyisobutene that bear free acid groups are found to be particularly advantageous in fuels and lubricants, particularly in fuels, having a content of alkali metals and/or alkaline earth metals and/or zinc of at least 0.1 ppm by weight, more preferably at least 0.2 ppm by weight and even more preferably at least 0.3 ppm by weight and especially at least 0.5 ppm by weight. Also conceivable is a content of alkali metals and/or alkaline earth metals and/or zinc of at least 1 ppm by weight, preferably at least 2 and more preferably at least 3 ppm by weight.

It is an advantage of the described reaction products of polyisobutene that bear free acid groups that they also exhibit their corrosion-inhibiting action in the presence of alkali metals and/or alkaline earth metals and/or zinc, preferably also in the presence of alkaline earth metals. The content of alkali metals and/or alkaline earth metals in fuels results, for example, from mixing with lubricants containing alkali metals and/or alkaline earth metals, for example in the fuel pump. In addition, alkali metals and/or alkaline earth metals may originate from non-desalinated or inadequately desalinated fuel additives, for example carrier oils. The entrainment of alkali metals and/or alkaline earth metals into the fuels can cause the abovementioned disadvantages. One example of a zinc source is antiwear additives.

Alkali metals include particularly sodium and potassium, especially sodium.

Alkaline earth metals include particularly magnesium and calcium, especially calcium.

Zinc should also be emphasized.

Particularly advantageously, the described reaction products of polyisobutene that bear free acid groups are still active even in the presence of calcium and do not exhibit any precipitation.

The stated amounts of alkali metals and/or alkaline earth metals and/or zinc each relate to individual metal species.

Description of the reaction products of polyisobutene that bear free acid groups The object was achieved by reaction products of polyisobutene that bear free acid groups, obtainable, preferably obtained, by reacting polyisobutene (A) having a number-average molecular weight Mn of 200 to 10 000, preferably 500 to 2500 and more preferably 700 to 1100, with at least one α,β-unsaturated mono- or dicarboxylic acid or their derivatives (B), in a stoichiometric ratio of more than one equivalent of α,β-unsaturated mono- or dicarboxylic acid or their derivatives (B) per reactive double bond in the polyisobutene (A).

The derivatives here are selected from the group consisting of monoalkyl esters, dialkyl esters and anhydrides.

In order to generate free acid groups in the case of the reaction of polyisobutenes with alkyl esters and/or anhydrides as compounds (B), this is subject to the proviso that, in the reaction product, in the case of use of monoalkyl esters and/or dialkyl esters as compound (B) at least 10% of the ester groups present are present in hydrolyzed form and/or in the case of use of anhydrides as compound (B) at least 10% of the anhydride groups present are present in hydrolyzed form.

"Reaction products bearing free acid groups" are understood here to mean not only, preferably, those reaction products—hydrolyzed or saponified if necessary—of polyisobutene with maleic acid and derivatives thereof, in the narrower sense, but also, in the wider sense, those products which are obtained from them or are obtainable from the reaction of polyisobutene with α,β-unsaturated monocarboxylic acids or their derivatives or α,β-unsaturated dicarboxylic acids or their derivatives other than maleic acid, since the monocarboxylic acids can often be obtained, for example, by decarboxylation from the dicarboxylic acids.

The usable polymer (A) comprises isobutene homopolymers or isobutene-comprising copolymers, referred to collectively here by the term "polyisobutene", that are obtainable as follows from the respective monomer mixtures:

For the use of isobutene or an isobutene-comprising monomer mixture as monomer to be polymerized, a suitable isobutene source is either pure isobutene or isobutene-containing $C_4$ hydrocarbon streams, for example $C_4$ raffinates, especially "raffinate 1", $C_4$ cuts from isobutane dehydrogenation, $C_4$ cuts from steamcrackers and from FCC crackers (fluid catalyzed cracking), provided that they have substantially been freed of 1,3-butadiene present therein. A $C_4$ hydrocarbon stream from an FCC refinery unit is also known as a "b/b" stream. Further suitable isobutene-containing $C_4$ hydrocarbon streams are, for example, the product stream of a propylene-isobutane cooxidation or the product stream from a metathesis unit, which are generally used after customary purification and/or concentration. Suitable $C_4$ hydrocarbon streams comprise generally less than 500 ppm, preferably less than 200 ppm, of butadiene. The presence of 1-butene and of cis- and trans-2-butene is substantially uncritical. Typically, the isobutene concentration in said $C_4$ hydrocarbon streams is in the range from 40% to 60% by weight. Thus, raffinate 1 generally consists essentially of 30% to 50% by weight of isobutene, 10% to 50% by weight of 1-butene, 10% to 40% by weight of cis- and trans-2-butene and 2% to 35% by weight of butanes; in the subsequent polymerization process, the unbranched butenes in the raffinate 1 are generally virtually inert and only the isobutene is polymerized.

In a preferred embodiment, the monomer source used for the polymerization is a technical $C_4$ hydrocarbon stream having an isobutene content of 1% to 100% by weight, especially of 1% to 99% by weight, in particular of 1% to 90% by weight, more preferably of 30% to 60% by weight, especially a raffinate 1 stream, a b/b stream from an FCC refinery unit, a product stream from a propylene-isobutane cooxidation or a product stream from a metathesis unit.

Especially when a raffinate 1 stream is used as isobutene source, the use of water as the sole initiator or as further initiator has been found to be useful, particularly when polymerization is effected at temperatures of −20° C. to +30° C., especially of 0° C. to +20° C. At temperatures of −20° C. to +30° C., especially of 0° C. to +20° C., however, it is possible to dispense with the use of an initiator when using a raffinate 1 stream as isobutene source.

Said isobutene-containing monomer mixture may comprise small amounts of contaminants such as water, carboxylic acids or mineral acids without causing any critical yield or selectivity losses. It is appropriate to the purpose to avoid accumulation of these impurities by removing such harmful substances from the isobutene-containing monomer mixture, for example, by adsorption on solid adsorbents such as activated carbon, molecular sieves or ion exchangers.

It is also possible to react monomer mixtures of isobutene or of the isobutene-containing hydrocarbon mixture with olefinically unsaturated monomers copolymerizable with isobutene. If monomer mixtures of isobutene with suitable comonomers are to be copolymerized, the monomer mixture comprises preferably at least 5% by weight, more preferably at least 10% by weight and especially at least 20% by weight of isobutene, and preferably at most 95% by weight, more preferably at most 90% by weight and especially at most 80% by weight of comonomers.

Useful copolymerizable monomers include: vinylaromatics such as styrene and α-methylstyrene, $C_1$- to $C_4$-alkylstyrenes such as 2-, 3- and 4-methylstyrene and 4-tert-butylstyrene, and isoolefins having 5 to 10 carbon atoms, such as 2-methylbutene-1, 2-methylpentene-1, 2-methylhexene-1, 2-ethylpentene-1, 2-ethylhexene-1 and 2-propylheptene-1. Further useful comonomers—depending on the polymerization conditions—include isoprene, 1-butene and cis- and trans-2-butene.

The process can be configured so as to preferentially form random polymers or preferably block copolymers. For preparation of block copolymers, it is possible, for example, to feed the different monomers successively to the polymerization reaction, in which case the second comonomer is especially not added until the first comonomer has already partly polymerized. In this way, diblock copolymers, triblock copolymers and higher block copolymers are obtainable, which, according to the sequence of monomer addition, have a block of one comonomer or another as a terminal block. In some cases, block copolymers also form when all comonomers are supplied simultaneously to the polymerization reaction, but one of them polymerizes significantly more quickly than the other(s). This is the case especially when isobutene and a vinylaromatic compound, especially styrene, are copolymerized in the process of the invention. This preferably gives rise to block copolymers having a terminal polystyrene block. This is attributable to the fact that the vinylaromatic compound, specifically styrene, polymerizes significantly more slowly than isobutene.

The polymerization can be effected either continuously or batchwise. Continuous process can be conducted in the liquid phase in analogy to known prior art processes for continuous polymerization of isobutene in the presence of Lewis acids, preferably boron trifluoride- or aluminum trichloride- or alkylaluminum chloride-based catalysts.

"Reactive double bonds" or "vinylidene bonds" are understood in the context of the present invention to mean terminal double bonds called α- and β-double bonds (collectively). These feature the following structural elements (represented here using the example of the isobutene homopolymer):

The proportion of reactive double bonds in the isobutene homo- or copolymers usable in accordance with the invention, based on α- and β-double bonds overall, may be from 30 to 100 mol %, preferably 40 to 97, more preferably 50 to 95, even more preferably 55 to 93 and especially 60 to 90 mol %.

The distribution of α-:β-double bonds in the polyisobutene (A) is generally from 100:0 to 10:90, preferably from 99:1 to 20:80, more preferably from 98:2 to 30:70, even more preferably from 97:3 to 40:60 and especially from 95:5 to 50:50.

The proportion of α- and β-double bonds and the distribution of α-:β-double bonds depends on the preparation of the polyisobutenes (A).

The content of double bonds is determined and assigned to the respective structures by the $^{13}$C NMR method as described in James J. Harrison, Donald C. Young, Charles L. Mayne, *J. Org. Chem.* 1997, 62, 693-699.

The vinylidene groups show the highest reactivity, for example in the case of thermal addition onto sterically demanding co-reactants such as maleic anhydride, whereas a double bond further toward the interior of the macromolecules shows lower reactivity, if any, in functionalization reactions in most cases.

Frequently, among the vinylidene groups, the α-double bonds are more rapidly and readily reactive than the β-double bonds, and so the reaction products of the reaction of the α-double bonds are at first formed to a higher degree than those of the β-double bonds in the reaction mixture over the course of the reaction. The effect of this can be that more severe reaction conditions are required for conversion of the β-double bonds than for conversion of the α-double bonds.

The number-average molecular weight $M_n$ of the polyisobutenes usable in the process of the invention is from 200 to 10 000.

Advantageously, it is possible to use polyisobutenes having a molecular weight $M_n$ of at least 500 and more preferably of at least 700 g/mol.

The molecular weight $M_n$ of the polyisobutenes may preferably be up to 2500 and more preferably up to 1100 g/mol.

The polydispersity $M_w/M_n$ may be from 1 to 10, preferably from 1.05 to 8, more preferably from 1.1 to 7, even more preferably from 1.15 to 6 and especially preferably from 1.2 to 5.

The weight-average molecular weight $M_w$ can be calculated from these data for $M_n$ and polydispersity.

According to the present invention, co-reactants for the polyisobutene (A) are α,β-unsaturated mono- and dicarboxylic acids and their derivatives (B), preferably α,β-unsaturated dicarboxylic acids and their derivatives.

Derivatives are understood to mean
the corresponding anhydrides in monomeric or else polymeric form,
mono- or dialkyl esters, preferably mono- or di-$C_1$-$C_4$-alkyl esters, more preferably mono- or dimethyl esters or the corresponding mono- or diethyl esters, and
mixed esters, preferably mixed esters having different $C_1$-$C_4$ alkyl components, more preferably mixed methyl ethyl esters.

Preferably, the derivatives are anhydrides in monomeric form or di-$C_1$-$C_4$-alkyl esters, more preferably anhydrides or methyl esters and most preferably anhydrides in monomeric form.

In the context of this document, $C_1$-$C_4$-alkyl is understood to mean methyl, ethyl, iso-propyl, n-propyl, n-butyl, iso-butyl, sec-butyl and tert-butyl, preferably methyl and ethyl, more preferably methyl.

The α,β-ethylenically unsaturated mono- or dicarboxylic acid is those mono- or dicarboxylic acids or their derivatives in which the carboxyl group or, in the case of dicarboxylic acids, at least one carboxyl group, preferably both carboxyl groups, is/are conjugated to the ethylenically unsaturated double bond.

Examples of ethylenically unsaturated mono- or dicarboxylic acids that are not α,β-ethylenically unsaturated are cis-5-norbornene-endo-2,3-dicarboxylic anhydride, exo-3,6-epoxy-1,2,3,6-tetrahydrophthalic anhydride and cis-4-cyclohexene-1,2-dicarboxylic anhydride.

Examples of α,β-ethylenically unsaturated monocarboxylic acids as component B) are acrylic acid, methacrylic acid, crotonic acid and ethylacrylic acid, preferably acrylic acid and methacrylic acid, referred to in this document as (meth)acrylic acid for short, and more preferably acrylic acid.

Particularly preferred derivatives of α,β-ethylenically unsaturated monocarboxylic acids are methyl acrylate, ethyl acrylate, n-butyl acrylate and methyl methacrylate.

Examples of dicarboxylic acids (B) are maleic acid, fumaric acid, itaconic acid (2-methylenebutanedioic acid), citraconic acid (2-methylmaleic acid), glutaconic acid (pent-2-ene-1,5-dicarboxylic acid), 2,3-dimethylmaleic acid, 2-methylfumaric acid, 2,3-dimethylfumaric acid, methylenemalonic acid and tetrahydrophthalic acid, preferably maleic acid and fumaric acid and more preferably maleic acid and their derivatives.

More particularly, the co-reactant (B) is maleic anhydride.

According to the invention, the molar ratio of component (B) to reactive double bond in the polyisobutene (A) is more than 1:1, more preferably at least 1.1:1, even more preferably at least 1.2:1, particularly at least 1.3:1 and especially at least 1.5:1.

In general, no advantage is achieved by a molar ratio of component (B) to reactive double bond in the polyisobutene (A) of more than 30:1, and it is preferably up to 25:1, more preferably up to 20:1 and most preferably up to 18:1.

Any excess of component (B) can generally be easily removed by distillation or by sublimation. The excess component (B) thus recovered can then be used once again in a further reaction.

The reaction is generally conducted at a temperature of 180 to 250° C., preferably 190 to 240 and more preferably of 200 to 230° C.

Since maleic anhydride as component (B) boils at about 202° C., the reaction at temperatures above 200° C., preferably above 190° C. and more preferably even at temperatures above 180° C. is conducted at least partly under autogenous pressure, preferably under slightly elevated pressure.

This elevated pressure should be at least 100 mbar gauge, preferably at least 200 mbar, more preferably at least 500 mbar and especially at least 1 bar.

In general, up to 10 bar gauge is sufficient, preferably up to 8 bar, more preferably up to 7 bar and most preferably up to 5 bar.

Preference is given to conducting the reaction under an inert atmosphere, particular preference being given to using nitrogen or carbon dioxide atmosphere.

According to the temperature, the duration of the reaction should be at least 15 minutes, preferably at least 30, more preferably at least 45 and most preferably at least 60 minutes. In particular, the reaction time should be at least 2 hours.

In general, and according to the temperature, the reaction should have concluded within 10 hours, preferably within 8 and more preferably within 7 hours.

It is a possible embodiment of the present invention to conduct the reaction without further solvent. This is preferable when a high excess of component (B) is being used and the reaction can be conducted in the melt of the liquid or molten component (B).

In a preferred embodiment, however, the reaction is conducted in a solvent which, naturally, should preferably not show any significant reaction with the polyisobutene and/or component (B) under the reaction conditions. The solvent preferably comprises hydrocarbons or hydrocarbon mixtures, carboxylic esters, ethers or ketones, more preferably hydrocarbons or hydrocarbon mixtures.

Preferred aromatic hydrocarbon mixtures are those that comprise predominantly aromatic $C_7$ to $C_{14}$ hydrocarbons and may encompass a boiling range from 110 to 300° C., particular preference being given to toluene, o-, m- or p-xylene, trimethylbenzene isomers, tetramethylbenzene isomers, ethylbenzene, cumene, tetrahydronaphthalene and mixtures comprising them.

Examples of these are the Solvesso® products from ExxonMobil Chemical, particularly Solvesso® 100 (CAS No. 64742-95-6, predominantly $C_9$ and $C_{10}$ aromatics, boiling range about 154-178° C.), 150 (boiling range about 182-207° C.) and 200 (CAS No. 64742-94-5), and the Shellsol® products from Shell, Caromax® (e.g. Caromax® 18) from Petrochem Carless and Hydrosol from DHC (e.g. as Hydrosol® A 170). Hydrocarbon mixtures composed of paraffins, cycloparaffins and aromatics are also commercially available under the Kristalloel (for example Kristalloel 30, boiling range about 158-198° C. or Kristalloel 60: CAS No. 64742-82-1), white spirit (for example likewise CAS No. 64742-82-1) or Solvent naphtha (light: boiling range about 155-180° C., heavy: boiling range about 225-300° C.) trade names. The aromatics content of such hydrocarbon mixtures is generally more than 90% by weight, preferably more than 95, more preferably more than 98 and most preferably more than 99% by weight. It may be advisable to use hydrocarbon mixtures having a particularly reduced content of naphthalene.

(Cyclo)aliphatic hydrocarbons are, for example, decalin, alkylated decalin and isomer mixtures of linear or branched alkanes and/or cycloalkanes.

In a preferred embodiment, the solvent used has a boiling point at standard pressure of at least 140° C.

It is a preferred embodiment of the present invention to execute the reaction in a reactor of which the reaction volume is filled to an extent of at least 50% by the liquid reaction mixture, preferably to an extent of at least 60%, more preferably to an extent of at least 66%, even more preferably to an extent of at least 75%, particularly to an extent of at least 90% and especially completely.

This has the advantage that, at the reaction temperature, the component (B) co-reactant, preferably maleic anhydride, remains in the liquid reaction mixture and can only escape into the gas phase in a minor proportion, and so the availability of component (B) in the reaction mixture is increased.

In a further preferred embodiment, said reactor has a low level of backmixing or is free of backmixing. These conveying characteristics are characterized by a Bodenstein number of at least 3, preferably at least 5, more preferably at least 7.

Optionally, it is possible to add stabilizers to the reaction mixture to suppress side reactions, preferably those as described in EP 156310 A2.

These additives are alkoxides, preferably the $C_2$- to $C_4$-alkoxides, of titanium, zirconium, vanadium or aluminum. Compounds of this kind are known per se and available. Especially suitable alkoxides are the compounds: titanium(IV) butoxide=$Ti(C_4H_9O)_4$, titanium(IV) i-butoxide=$Ti[(CH_3)_2CHCH_2O]_4$, titanium(IV) ethoxide=$Ti(C_2H_5O)_4$, titanium(IV) i-propoxide=$Ti(OC_3H_7)_4$, titanium (IV) n-propoxide=$Ti(C_3H_7O)_4$, zirconium n-butoxide-butanol complex=$(C_4H_9O)_4Zr.C_4H_9OH$, zirconium i-propoxide=$Zr(OC_3H_7)=C_3H_7OH$, zirconium n-propoxide=$Zr(OC_3H_7)_4$, vanadium(V) tri-n-butoxide oxide=$VO(OC_4H_9)_3$, vanadium(V) triethoxide oxide=$VO(OC_2H_5)_3$, vanadium(V) tri-i-propoxide oxide=$VO(OC_3H_7)_3$, vanadium(V) tris-n-propoxide oxide=$VO(OC_3H_7)_3$, aluminum i-butoxide=$Al(OC_4H_9)_3$, aluminum n-butoxide=$Al(OC_4H_9)_3$, aluminum s-butoxide=$Al(OC_4H_9)_3$, aluminum t-butoxide=$Al(OC_4H_9)_3$ or aluminum i-propoxide =$Al(OC_3R_7)_3$.

The alkoxides mentioned are in the liquid state, possibly in the form of a complex with the corresponding alcohol, and are used in this form in the reaction of the invention. They are used with a purity of 95% to 99% by weight, and in the case of the alkoxides of aluminum of 90% to 99% by weight. The alkoxides to be used are soluble in the reaction mixture.

The stabilizers are used in amounts of 1 to 5000, preferably 5 to 1000 ppm by weight, more preferably 10 to 500 ppm by weight, even more preferably 25 to 300 ppm by weight, based on the olefin used.

In a preferred embodiment, no further stabilizers are used in the process of the invention.

In the reaction of polyisobutene homopolymer with maleic anhydride shown here by way of example, especially at relatively high molar ratios of maleic anhydride to polyisobutene, compounds bearing more than one succinic anhydride group per polymer may form as conversion products. These products have different structures proceeding from α- or β-double bonds:

In these reaction schemes, n is a natural number from 2 to 39, preferably from 3 to 34, more preferably from 4 to 25, even more preferably from 5 to 19 and especially from 6 to 16.

The ratio of the more highly maleated to the singly maleated components can be reported by the "bismaleation level" (BML). The BML is known per se (see also U.S. Pat. No. 5,883,196) and can be determined by the following formula:

$$BML = 100\% \times [(\text{wt-\%}(BM\ PIBSA)/(\text{wt-\%}(BM\ PIBSA) + \text{wt-\%}(PIBSA))]$$

where wt-% (X) represents the respective proportion by weight of component X (X=PIBSA (monomaleated polyisobutene) or BM PIBSA (more than monomaleated polyisobutene)) in the reaction product of polyisobutene with maleic anhydride.

The bismaleation level is preferably calculated from the hydrolysis number according to DIN 53401:1988-06 of the sample. It may be necessary here to solubilize the sample with a suitable solvent, preferably in a 2:1 mixture of toluene and ethanol.

It should be noted here that only the ratio of the more highly maleated components to the monomaleated components is taken into account, whereas unconverted polyisobutene present in the reaction mixture, for example that which does not comprise any reactive double bonds, is not included in the determination of the bismaleation level. Therefore, the reaction mixture may also still comprise unconverted polyisobutene, which usually corresponds to the proportion in the polyisobutene used that does not comprise any reactive double bonds, whereas the proportion in the polyisobutene that comprises reactive double bonds preferably reacts completely or virtually completely.

The proportion of unconverted polyisobutene present in the reaction mixture therefore generally corresponds to 100 minus the above-specified proportion of reactive double bonds in the isobutene homo- or copolymers usable in accordance with the invention.

The proportion of unconverted polyisobutene is preferably not more than 30% by weight, more preferably not more than 25% by weight, even more preferably not more than 20% by weight, particularly not more than 15% by weight and especially not more than 10% by weight.

To determine the proportion of maleated components in relation to the unconverted polyisobutene, the reaction mixture is dissolved in n-heptane and applied to a column of silica gel 60 and eluted with n-heptane until no product occurs in the eluate any longer. With the aid of column chromatography, the unconverted polyisobutene is separated from the maleated components since the maleated components are not eluted. After the solvent has been removed by distillation, the proportion by weight of maleated components in the reaction mixture is determined by weighing.

The above formula can also be applied analogously to other components (B) than maleic anhydride, and for the sake of simplicity is likewise referred to as bismaleation level for other components (B) than maleic anhydride. Formulated in general terms, the bismaleation level thus represents the proportion by weight of those products that bear more than one compound (B) per polyisobutene chain in relation to the total amount of products that bear one or more than one compound (B) per polyisobutene chain, with the determination taking into account only those polyisobutene chains that bear reactive double bonds.

The use of the invention is that of reaction products of polyisobutene that bear free acid groups, the bismaleation level of which is at least 1%, preferably at least 2%, more preferably at least 3%, even more preferably at least 4%, particularly at least 5% and especially at least 6%.

Further advantageously, it is possible to use those reaction products of polyisobutene that bear free acid groups and have a bismaleation level of at least 7%, preferably at least 8%, more preferably at least 9%, even more preferably at least 10%, particularly at least 11% and especially at least 12%.

The bismaleation level may be up to 40%, preferably up to 35%, more preferably up to 30%, particularly up to 25% and especially up to 20%.

The best results are achieved at a bismaleation level of 10% to 40%, preferably 12% to 35% and more preferably 15% to 30%.

After the reaction has ended (reaction step (I)), it is possible with preference to separate excess and unconverted component (B) from the reaction product of components (A) and (B), preferably by distillation or sublimation, but an extraction, for example, is also conceivable. The reaction mixture thus obtained is then subjected to hydrolysis or saponification (reaction step (II)), in order to meet the proviso according to the invention, when component (B) is an anhydride or an alkyl ester:

A hydrolysis is operated in reaction step (II) when the derivative of monomer (A) used is an anhydride, preferably the anhydride of a dicarboxylic acid, whereas, when using an ester as monomer (A), it is possible to operate a saponification or hydrolysis.

For a hydrolysis, based on the anhydride functionalities present, water is added in the amount corresponding to the desired degree of hydrolysis, and the reaction product obtained from (I) is heated in the presence of the added water. Generally speaking, a temperature of preferably 20 to 150° C. is sufficient for this purpose, preferably 60 to 100° C. If necessary, the reaction can be carried out under pressure, in order to prevent the escape of water. Under these reaction conditions, generally speaking, the anhydride functionalities in the reaction product are reacted selectively, whereas any carboxylic ester functionalities present in the reaction product do not react, or at least react only to a minor extent.

For a saponification, the reaction product is reacted with a strong base in an amount corresponding to the desired degree of saponification, this reaction taking place in the presence of water.

Strong bases used may with preference be hydroxides, oxides, carbonates or hydrogen carbonates of alkali metals or alkaline earth metals.

Then, preferably after removal of excess compound (B), the reaction product obtained from (I) is heated in the presence of the added water and of the strong base. Generally speaking, a temperature of preferably 20 to 130° C. is sufficient for this purpose, more preferably 50 to 110° C. If necessary, the reaction can be carried out under pressure.

It is also possible to carry out hydrolysis of the carboxylic ester functionalities with water in the presence of an acid. Acids used in that case are preferably mineral, carboxylic, sulfonic or phosphorus-containing acids having a pKa of not more than 5, more preferably not more than 4.

Examples are acetic acid, formic acid, oxalic acid, salicylic acid, substituted succinic acids, benzenesulfonic acids with or without substitution on the aromatic moiety, sulfuric acid, nitric acid, hydrochloric acid or phosphoric acid; the use of acidic ion exchanger resins is also conceivable.

Then, preferably after removal of excess compound (B), the reaction product obtained from (I) is heated in the presence of the added water and of the acid. For this purpose, generally speaking, a temperature of preferably 40 to 200° C. is sufficient, more preferably 80 to 150° C. If necessary, the reaction can be carried out under pressure.

If the reaction product obtained from step (II) still contains residues of acid anions, it may be preferable for these acid anions to be removed from the product by means of an ion exchanger and replaced preferably with hydroxide ions or carboxylate ions, more preferably hydroxide ions. This is especially the case when the acid anions present in the product are halides, sulfur-containing or nitrogen-containing.

Use

The inventive use relates to the inhibition of corrosion of iron, steel and/or nonferrous metal surfaces.

Among the nonferrous metals, preference is given to copper and alloys thereof.

More preferably, the corrosion of steel surfaces is inhibited.

The described reaction products of polyisobutene that bear free acid groups are added to fuels having the above-specified content of alkali metals and/or alkaline earth metals and/or zinc, generally in amounts of 1 to 60, preferably 4 to 50 ppm by weight and more preferably of 10 to 40 ppm by weight.

Frequently, the described reaction products of polyisobutene that bear free acid groups are used in the form of fuel additive mixtures, together with customary additives:

In the case of diesel fuels, these are primarily customary detergent additives, carrier oils, cold flow improvers, lubricity improvers, corrosion inhibitors other than the described reaction products of polyisobutene that bear free acid groups, demulsifiers, dehazers, antifoams, cetane number improvers, combustion improvers, antioxidants or stabilizers, antistats, metallocenes, metal deactivators, dyes and/or solvents.

In the case of gasoline fuels, these are in particular lubricity improvers (friction modifiers), corrosion inhibitors other than the described reaction products of polyisobutene that bear free acid groups, demulsifiers, dehazers, antifoams, combustion improvers, antioxidants or stabilizers, antistats, metallocenes, metal deactivators, dyes and/or solvents.

Typical examples of suitable coadditives are listed in the following section:

B1) Detergent Additives

The customary detergent additives are preferably amphiphilic substances which possess at least one hydrophobic hydrocarbon radical with a number-average molecular weight ($M_r$) of 85 to 20 000 and at least one polar moiety selected from:

(Da) mono- or polyamino groups having up to 6 nitrogen atoms, at least one nitrogen atom having basic properties;
(Db) nitro groups, optionally in combination with hydroxyl groups;
(Dc) hydroxyl groups in combination with mono- or polyamino groups, at least one nitrogen atom having basic properties;
(Dd) carboxyl groups or the alkali metal or alkaline earth metal salts thereof;
(De) sulfonic acid groups or the alkali metal or alkaline earth metal salts thereof;
(Df) polyoxy-$C_2$- to $C_4$-alkylene moieties terminated by hydroxyl groups, mono- or polyamino groups, at least one nitrogen atom having basic properties, or by carbamate groups;
(Dg) carboxylic ester groups;
(Dh) moieties derived from succinic anhydride and having hydroxyl and/or amino and/or amido and/or imido groups; and/or
(Di) moieties obtained by Mannich reaction of substituted phenols with aldehydes and mono- or polyamines.

The hydrophobic hydrocarbon radical in the above detergent additives, which ensures the adequate solubility in the fuel, has a number-average molecular weight ($M_r$) of 85 to 20 000, preferably of 113 to 10 000, more preferably of 300 to 5000, even more preferably of 300 to 3000, even more especially preferably of 500 to 2500 and especially of 700 to 2500, in particular of 800 to 1500. As typical hydrophobic hydrocarbon radicals, especially in conjunction with the polar, especially polypropenyl, polybutenyl and polyisobutenyl radicals with a number-average molecular weight $M_n$ of preferably in each case 300 to 5000, more preferably 300 to 3000, even more preferably 500 to 2500, even more especially preferably 700 to 2500 and especially 800 to 1500 come into consideration.

Examples of the above groups of detergent additives include the following:

Additives comprising mono- or polyamino groups (Da) are preferably polyalkenemono- or polyalkenepolyamines based on polypropene or on high-reactivity (i.e. having predominantly terminal double bonds) or conventional (i.e. having predominantly internal double bonds) polybutene or polyisobutene with $M_n$=300 to 5000, more preferably 500 to 2500 and especially 700 to 2500. Such additives based on high-reactivity polyisobutene, which can be prepared from the polyisobutene which may comprise up to 20% by weight of n-butene units by hydroformylation and reductive amination with ammonia, monoamines or polyamines such as dimethylaminopropylamine, ethylenediamine, diethylenetriamine, triethylenetetramine or tetraethylenepentamine, are known especially from EP-A 244 616. When polybutene or polyisobutene having predominantly internal double bonds (usually in the β and γ positions) are used as starting materials in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or the abovementioned polyamines. Corresponding additives based on polypropene are described more particularly in WO-A 94/24231.

Further particular additives comprising monoamino groups (Da) are the hydrogenation products of the reaction products of polyisobutenes having an average degree of polymerization P=5 to 100 with nitrogen oxides or mixtures of nitrogen oxides and oxygen, as described more particularly in WO-A 97/03946.

Further particular additives comprising monoamino groups (Da) are the compounds obtainable from polyisobutene epoxides by reaction with amines and subsequent dehydration and reduction of the amino alcohols, as described more particularly in DE-A 196 20 262.

Additives comprising nitro groups (Db), optionally in combination with hydroxyl groups, are preferably reaction products of polyisobutenes having an average degree of polymerization P=5 to 100 or 10 to 100 with nitrogen oxides or mixtures of nitrogen oxides and oxygen, as described more particularly in WO-A 96/03367 and in WO-A 96/03479. These reaction products are generally mixtures of pure nitropolyisobutenes (e.g. α,β-dinitropolyisobutene) and mixed hydroxynitropolyisobutenes (e.g. α-nitro-β-hydroxypolyisobutene).

Additives comprising hydroxyl groups in combination with mono- or polyamino groups (Dc) are especially reaction products of polyisobutene epoxides obtainable from polyisobutene having preferably predominantly terminal double bonds and $M_n$=300 to 5000, with ammonia or mono- or polyamines, as described more particularly in EP-A 476 485.

Additives comprising carboxyl groups or their alkali metal or alkaline earth metal salts (Dd) are preferably copolymers of $C_2$- to $C_{40}$-olefins with maleic anhydride which have a total molar mass of 500 to 20 000 and wherein some or all of the carboxyl groups have been converted to the alkali metal or alkaline earth metal salts and any remainder of the carboxyl groups has been reacted with alcohols or amines. Such additives are disclosed more particularly by EPA 307 815. Such additives serve mainly to prevent valve seat wear and can, as described in WO-A 87/01126, advantageously be used in combination with customary fuel detergents such as poly(iso)buteneamines or polyetheramines.

Additives comprising sulfonic acid groups or their alkali metal or alkaline earth metal salts (De) are preferably alkali metal or alkaline earth metal salts of an alkyl sulfosuccinate, as described more particularly in EP-A 639 632. Such additives serve mainly to prevent valve seat wear and can be used advantageously in combination with customary fuel detergents such as poly(iso)buteneamines or polyetheramines.

Additives comprising polyoxy-$C_2$-$C_4$-alkylene moieties (Df) are preferably polyethers or polyetheramines which are obtainable by reaction of $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described more particularly in EP-A 310 875, EP-A 356 725, EP-A 700 985 and U.S. Pat. No. 4,877,416. In the case of polyethers, such products also satisfy carrier oil properties. Typical examples thereof are tridecanol butoxylates or isotridecanol butoxylates, isononylphenol butoxylates and also polyisobutenol butoxylates and propoxylates, and also the corresponding reaction products with ammonia.

Additives comprising carboxylic ester groups (Dg) are preferably esters of mono-, di- or tricarboxylic acids with long-chain alkanols or polyols, especially those having a minimum viscosity of 2 mm$^2$/s at 100° C., as described more particularly in DE-A 38 38 918. The mono-, di- or tricarboxylic acids used may be aliphatic or aromatic acids; particularly suitable ester alcohols or ester polyols are long-chain representatives having, for example, 6 to 24 carbon atoms. Typical representatives of the esters are adipates, phthalates, isophthalates, terephthalates and trimellitates of isooctanol, of isononanol, of isodecanol and of isotridecanol. Such products also satisfy carrier oil properties.

Additives comprising moieties derived from succinic anhydride and having hydroxyl and/or amino and/or amido and/or especially imido groups (Dh) are preferably corresponding derivatives of alkyl- or alkenyl-substituted succinic anhydride and especially the corresponding derivatives of polyisobutenylsuccinic anhydride which are obtainable by reacting conventional or high-reactivity polyisobutene having $M_n$=preferably 300 to 5000, more preferably 300 to 3000, even more preferably 500 to 2500, even more especially preferably 700 to 2500 and especially 800 to 1500, with maleic anhydride by a thermal route in an ene reaction or via the chlorinated polyisobutene. The moieties having hydroxyl and/or amino and/or amido and/or imido groups are, for example, carboxylic acid groups, acid amides of monoamines, acid amides of di- or polyamines which, in addition to the amide function, also have free amine groups, succinic acid derivatives having an acid and an amide function, carboximides with monoamines, carboximides with di- or polyamines which, in addition to the imide function, also have free amine groups, or diimides which are formed by the reaction of di- or polyamines with two succinic acid derivatives. Such fuel additives are common knowledge and are described, for example, in documents (1) and (2). They are preferably the reaction products of alkyl- or alkenyl-substituted succinic acids or derivatives thereof with amines and more preferably the reaction products of polyisobutenyl-substituted succinic acids or derivatives thereof with amines. Of particular interest in this context are reaction products with aliphatic polyamines (polyalkyleneimines) such as, more particularly, ethylenediamine, diethylenetriamine, triethylenetetramine, tetraethylenepentamine, pentaethylenehexamine and hexamethylene-heptamine, which have an imide structure.

Additives comprising moieties (Di) obtained by Mannich reaction of substituted phenols with aldehydes and mono- or polyamines are preferably reaction products of polyisobutene-substituted phenols with formaldehyde and mono- or polyamines such as ethylenediamine, diethylenetriamine, triethylenetetramine, tetraethylenepentamine or dimethylaminopropylamine. The polyisobutenyl-substituted phenols may originate from conventional or high-reactivity polyisobutene having $M_n$=300 to 5000. Such "polyisobutene Mannich bases" are described more particularly in EP-A 831 141.

One or more of the detergent additives mentioned can be added to the fuel in such an amount that the dosage rate of these detergent additives is preferably 25 to 2500 ppm by weight, especially 75 to 1500 ppm by weight, in particular 150 to 1000 ppm by weight.

B2) Carrier Oils

Carrier oils additionally used may be of mineral or synthetic nature. Suitable mineral carrier oils are fractions obtained in crude oil processing, such as brightstock or base oils having viscosities, for example, from the SN 500-2000 class; but also aromatic hydrocarbons, paraffinic hydrocarbons and alkoxyalkanols. Likewise useful is a fraction which is obtained in the refining of mineral oil and is known as "hydrocrack oil" (vacuum distillate cut having a boiling range of from about 360 to 500° C., obtainable from natural mineral oil which has been catalytically hydrogenated under high pressure and isomerized and also deparaffinized). Likewise suitable are mixtures of the abovementioned mineral carrier oils.

Examples of suitable synthetic carrier oils are polyolefins (polyalphaolefins or polyinternalolefins), (poly)esters, (poly)alkoxylates, polyethers, aliphatic polyetheramines, alkylphenol-started polyethers, alkylphenol-started polyetheramines and carboxylic esters of long-chain alkanols.

Examples of suitable polyolefins are olefin polymers having $M_n$=400 to 1800, in particular based on polybutene or polyisobutene (hydrogenated or unhydrogenated).

Examples of suitable polyethers or polyetheramines are preferably compounds comprising polyoxy-$C_2$- to $C_4$-alkylene moieties obtainable by reacting $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group, and, in the case of the polyetheramines, by subsequent reductive amination with ammonia, monoamines or polyamines. Such products are described more particularly in EP-A 310 875, EP-A 356 725, EP-A 700 985 and U.S. Pat. No. 4,877,416. For example, the polyetheramines used may be poly-$C_2$- to $C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are more particularly esters of mono-, di- or tricarboxylic acids with long-chain alkanols or polyols, as described more particularly in DE-A 38 38 918. The mono-, di- or tricarboxylic acids used may be aliphatic or aromatic acids; particularly suitable ester alcohols or ester polyols are long-chain representatives having, for example, 6 to 24 carbon atoms. Typical representatives of the esters are adipates, phthalates, isophthalates, terephthalates and trimellitates of isooctanol, isononanol, isodecanol and isotridecanol, for example di(n- or isotridecyl) phthalate.

Further suitable carrier oil systems are described, for example, in DE-A 38 26 608, DE-A 41 42 241, DE-A 43 09 074, EP-A 452 328 and EP-A 548 617.

Examples of particularly suitable synthetic carrier oils are alcohol-started polyethers having about 5 to 35, preferably about 5 to 30, more preferably 10 to 30 and especially 15 to 30 $C_3$- to $C_6$-alkylene oxide units, for example propylene oxide, n-butylene oxide and isobutylene oxide units, or mixtures thereof, per alcohol molecule. Nonlimiting examples of suitable starter alcohols are long-chain alkanols or phenols substituted by long-chain alkyl in which the long-chain alkyl radical is especially a straight-chain or branched $C_6$- to $C_{18}$-alkyl radical. Particular examples include tridecanol and nonylphenol. Particularly preferred alcohol-started polyethers are the reaction products (polyetherification products) of monohydric aliphatic $C_6$- to $C_{18}$-alcohols with $C_3$- to $C_6$-alkylene oxides. Examples of monohydric aliphatic $C_6$-$C_{18}$-alcohols are hexanol, heptanol, octanol, 2-ethylhexanol, nonyl alcohol, decanol, 3-propylheptanol, undecanol, dodecanol, tridecanol, tetradecanol, pentadecanol, hexadecanol, octadecanol and the constitutional and positional isomers thereof. The alcohols can be used either in the form of the pure isomers or in the form of technical grade mixtures. A particularly preferred alcohol is tridecanol. Examples of $C_3$- to $C_6$-alkylene oxides are propylene oxide, such as 1,2-propylene oxide, butylene oxide, such as 1,2-butylene oxide, 2,3-butylene oxide, isobutylene oxide or tetrahydrofuran, pentylene oxide and hexylene oxide. Particular preference among these is given to $C_3$- to $C_4$-alkylene oxides, i.e. propylene oxide such as 1,2-propylene oxide and butylene oxide such as 1,2-butylene oxide, 2,3-butylene oxide and isobutylene oxide. Especially butylene oxide is used.

Further suitable synthetic carrier oils are alkoxylated alkylphenols, as described in DE-A 10 102 913.

Particular carrier oils are synthetic carrier oils, particular preference being given to the above-described alcohol-started polyethers.

The carrier oil or the mixture of different carrier oils is added to the fuel in an amount of preferably 1 to 1000 ppm by weight, more preferably of 10 to 500 ppm by weight and especially of 20 to 100 ppm by weight.

B3) Cold Flow Improvers

Suitable cold flow improvers are in principle all organic compounds which are capable of improving the flow performance of middle distillate fuels or diesel fuels under cold conditions. For the intended purpose, they must have sufficient oil solubility. More particularly, useful cold flow improvers for this purpose are the cold flow improvers (middle distillate flow improvers, MDFIs) typically used in the case of middle distillates of fossil origin, i.e. in the case of customary mineral diesel fuels. However, it is also possible to use organic compounds which partly or predominantly have the properties of a wax antisettling additive ("WASA") when used in customary diesel fuels. They can also act partly or predominantly as nucleators. It is also possible to use mixtures of organic compounds effective as MDFIs and/or effective as WASAs and/or effective as nucleators.

The cold flow improver is typically selected from:
(K1) copolymers of a $C_2$- to $C_{40}$-olefin with at least one further ethylenically unsaturated monomer;
(K2) comb polymers;
(K3) polyoxyalkylenes;
(K4) polar nitrogen compounds;
(K5) sulfocarboxylic acids or sulfonic acids or derivatives thereof; and
(K6) poly(meth)acrylic esters.

It is possible to use either mixtures of different representatives from one of the particular classes (K1) to (K6) or mixtures of representatives from different classes (K1) to (K6).

Suitable $C_2$- to $C_{40}$-olefin monomers for the copolymers of class (K1) are, for example, those having 2 to 20 and especially 2 to 10 carbon atoms, and 1 to 3 and preferably 1 or 2 carbon-carbon double bonds, especially having one carbon-carbon double bond. In the latter case, the carbon-carbon double bond may be arranged either terminally ($\alpha$-olefins) or internally. However, preference is given to $\alpha$-olefins, particular preference to $\alpha$-olefins having 2 to 6 carbon atoms, for example propene, 1-butene, 1-pentene, 1-hexene and in particular ethylene.

In the copolymers of class (K1), the at least one further ethylenically unsaturated monomer is preferably selected from alkenyl carboxylates, (meth)acrylic esters and further olefins.

When further olefins are also copolymerized, they are preferably higher in molecular weight than the abovementioned $C_2$- to $C_{40}$-olefin base monomers. When, for example, the olefin base monomer used is ethylene or propene, suitable further olefins are especially $C_{10}$- to $C_{40}$-$\alpha$-olefins. Further olefins are in most cases only additionally copolymerized when monomers with carboxylic ester functions are also used.

Suitable (meth)acrylic esters are, for example, esters of (meth)acrylic acid with $C_1$- to $C_{20}$-alkanols, especially $C_1$- to $C_{10}$-alkanols, in particular with methanol, ethanol, propanol, isopropanol, n-butanol, sec-butanol, isobutanol, tert-butanol, pentanol, hexanol, heptanol, octanol, 2-ethylhexanol, nonanol and decanol, and structural isomers thereof.

Suitable alkenyl carboxylates are, for example, $C_2$- to $C_{14}$-alkenyl esters, for example the vinyl and propenyl esters, of carboxylic acids having 2 to 21 carbon atoms, whose hydrocarbyl radical may be linear or branched. Among these, preference is given to the vinyl esters. Among the carboxylic acids with a branched hydrocarbyl radical, preference is given to those whose branch is in the $\alpha$ position to the carboxyl group, and the $\alpha$-carbon atom is more preferably tertiary, i.e. the carboxylic acid is what is called a neocarboxylic acid. However, the hydrocarbyl radical of the carboxylic acid is preferably linear.

Examples of suitable alkenyl carboxylates are vinyl acetate, vinyl propionate, vinyl butyrate, vinyl 2-ethylhexanoate, vinyl neopentanoate, vinyl hexanoate, vinyl neononanoate, vinyl neodecanoate and the corresponding propenyl esters, preference being given to the vinyl esters. A particularly preferred alkenyl carboxylate is vinyl acetate; typical copolymers of group (K1) resulting therefrom are ethylene-vinyl acetate copolymers ("EVAs"), which are some of the most frequently used.

Ethylene-vinyl acetate copolymers usable particularly advantageously and the preparation thereof are described in WO 99/29748.

Suitable copolymers of class (K1) are also those which comprise two or more different alkenyl carboxylates in copolymerized form, which differ in the alkenyl function and/or in the carboxylic acid group. Likewise suitable are copolymers which, as well as the alkenyl carboxylate(s), comprise at least one olefin and/or at least one (meth)acrylic ester in copolymerized form.

Terpolymers of a $C_2$- to $C_{40}$-$\alpha$-olefin, a $C_1$- to $C_{20}$-alkyl ester of an ethylenically unsaturated monocarboxylic acid having 3 to 15 carbon atoms and a $C_2$- to $C_{14}$-alkenyl ester of a saturated monocarboxylic acid having 2 to 21 carbon atoms are also suitable as copolymers of class (K1). Terpolymers of this kind are described in WO 2005/054314. A typical terpolymer of this kind is formed from ethylene, 2-ethylhexyl acrylate and vinyl acetate.

The at least one or the further ethylenically unsaturated monomer(s) are copolymerized in the copolymers of class (K1) in an amount of preferably 1 to 50% by weight, especially 10 to 45% by weight and in particular 20 to 40% by weight, based on the overall copolymer. The main proportion in terms of weight of the monomer units in the copolymers of class (K1) therefore originates generally from the $C_2$- to $C_{40}$ base olefins.

The copolymers of class (K1) preferably have a number-average molecular weight $M_n$ of 1000 to 20 000, more preferably of 1000 to 10 000 and especially of 1000 to 8000.

Typical comb polymers of component (K2) are, for example, obtainable by the copolymerization of maleic anhydride or fumaric acid with another ethylenically unsaturated monomer, for example with an α-olefin or an unsaturated ester, such as vinyl acetate, and subsequent esterification of the anhydride or acid function with an alcohol having at least 10 carbon atoms. Further suitable comb polymers are copolymers of α-olefins and esterified comonomers, for example esterified copolymers of styrene and maleic anhydride or esterified copolymers of styrene and fumaric acid. Suitable comb polymers may also be polyfumarates or polymaleates. Homo- and copolymers of vinyl ethers are also suitable comb polymers. Comb polymers suitable as components of class (K2) are, for example, also those described in WO 2004/035715 and in "Comb-Like Polymers, Structure and Properties", N. A. Platé and V. P. Shibaev, J. Poly. Sci. Macromolecular Revs. 8, pages 117 to 253 (1974). Mixtures of comb polymers are also suitable.

Polyoxyalkylenes suitable as components of class (K3) are, for example, polyoxyalkylene esters, polyoxyalkylene ethers, mixed polyoxyalkylene ester/ethers and mixtures thereof. These polyoxyalkylene compounds preferably comprise at least one linear alkyl group, preferably at least two linear alkyl groups, each having 10 to 30 carbon atoms and a polyoxyalkylene group having a number-average molecular weight of up to 5000. Such polyoxyalkylene compounds are described, for example, in EP-A 061 895 and also in U.S. Pat. No. 4,491,455. Particular polyoxyalkylene compounds are based on polyethylene glycols and polypropylene glycols having a number-average molecular weight of 100 to 5000. Additionally suitable are polyoxyalkylene mono- and diesters of fatty acids having 10 to 30 carbon atoms, such as stearic acid or behenic acid.

Polar nitrogen compounds suitable as components of class (K4) may be either ionic or nonionic and preferably have at least one substituent, especially at least two substituents, in the form of a tertiary nitrogen atom of the general formula >$NR^7$ in which $R^7$ is a $C_8$- to $C_{40}$-hydrocarbyl radical. The nitrogen substituents may also be quaternized, i.e. be in cationic form. Examples of such nitrogen compounds are ammonium salts and/or amides which are obtainable by the reaction of at least one amine substituted by at least one hydrocarbyl radical with a carboxylic acid having 1 to 4 carboxyl groups or with a suitable derivative thereof. The amines preferably comprise at least one linear $C_8$- to $C_{40}$-alkyl radical. Primary amines suitable for preparing the polar nitrogen compounds mentioned are, for example, octylamine, nonylamine, decylamine, undecylamine, dodecylamine, tetradecylamine and the higher linear homologs; secondary amines suitable for this purpose are, for example, dioctadecylamine and methylbehenylamine. Also suitable for this purpose are amine mixtures, especially amine mixtures obtainable on the industrial scale, such as fatty amines or hydrogenated tallamines, as described, for example, in Ullmann's Encyclopedia of Industrial Chemistry, 6th Edition, "Amines, aliphatic" chapter. Acids suitable for the reaction are, for example, cyclohexane-1,2-dicarboxylic acid, cyclohexene-1,2-dicarboxylic acid, cyclopentane-1,2-dicarboxylic acid, naphthalenedicarboxylic acid, phthalic acid, isophthalic acid, terephthalic acid, and succinic acids substituted by long-chain hydrocarbyl radicals.

More particularly, the component of class (K4) is an oil-soluble reaction product of poly($C_2$- to $C_{20}$-carboxylic acids) having at least one tertiary amino group with primary or secondary amines. The poly($C_2$- to $C_{20}$-carboxylic acids) which have at least one tertiary amino group and form the basis of this reaction product comprise preferably at least 3 carboxyl groups, especially 3 to 12 and in particular 3 to 5 carboxyl groups. The carboxylic acid units in the polycarboxylic acids have preferably 2 to 10 carbon atoms, and are especially acetic acid units. The carboxylic acid units are suitably bonded to the polycarboxylic acids, usually via one or more carbon and/or nitrogen atoms. They are preferably attached to tertiary nitrogen atoms which, in the case of a plurality of nitrogen atoms, are bonded via hydrocarbon chains.

The component of class (K4) is preferably an oil-soluble reaction product based on poly($C_2$- to $C_{20}$-carboxylic acids) which have at least one tertiary amino group and are of the general formula IIa or IIb in which the variable A is a straight-chain or branched $C_2$- to $C_6$-alkylene group or the moiety of the formula III and the variable B is a $C_1$- to $C_{19}$-alkylene group. The compounds of the general formulae IIa and IIb especially have the properties of a WASA.

Moreover, the preferred oil-soluble reaction product of component (K4), especially that of the general formula IIa or IIb, is an amide, an amide-ammonium salt or an ammonium salt in which no, one or more carboxylic acid groups have been converted to amide groups.

Straight-chain or branched $C_2$- to $C_6$-alkylene groups of the variable A are, for example, 1,1-ethylene, 1,2-propylene, 1,3-propylene, 1,2-butylene, 1,3-butylene, 1,4-butylene, 2-methyl-1,3-propylene, 1,5-pentylene, 2-methyl-1,4-butylene, 2,2-dimethyl-1,3-propylene, 1,6-hexylene (hexamethylene) and especially 1,2-ethylene. The variable A comprises preferably 2 to 4 and especially 2 or 3 carbon atoms.

$C_1$- to $C_{19}$-alkylene groups of the variable B are, for example, 1,2-ethylene, 1,3-propylene, 1,4-butylene, hexamethylene, octamethylene, decamethylene, dodecamethylene, tetradecamethylene, hexadecamethylene, octadecamethylene, nonadecamethylene and especially methylene. The variable B comprises preferably 1 to 10 and especially 1 to 4 carbon atoms.

The primary and secondary amines as a reaction partner for the polycarboxylic acids to form component (K4) are typically monoamines, especially aliphatic monoamines. These primary and secondary amines may be selected from a multitude of amines which bear hydrocarbyl radicals which may optionally be bonded to one another.

These parent amines of the oil-soluble reaction products of component (K4) are usually secondary amines and have the general formula $HN(R^8)_2$ in which the two variables $R^8$ are each independently straight-chain or branched $C_{10}$- to $C_{30}$-alkyl radicals, especially $C_{14}$- to $C_{24}$-alkyl radicals. These relatively long-chain alkyl radicals are preferably straight-chain or only slightly branched. In general, the secondary amines mentioned, with regard to their relatively long-chain alkyl radicals, derive from naturally occurring fatty acids and from derivatives thereof. The two $R^8$ radicals are preferably identical.

The secondary amines mentioned may be bonded to the polycarboxylic acids by means of amide structures or in the form of the ammonium salts; it is also possible for only a portion to be present as amide structures and another portion as ammonium salts. Preferably only few, if any, free acid groups are present. The oil-soluble reaction products of component (K4) are preferably present completely in the form of the amide structures.

Typical examples of such components (K4) are reaction products of nitrilotriacetic acid, of ethylenediaminetetraacetic acid or of propylene-1,2-diaminetetraacetic acid with in each case 0.5 to 1.5 mol per carboxyl group, especially 0.8 to 1.2 mol per carboxyl group, of dioleylamine, dipalmitamine, dicocoamine, distearylamine, dibehenylamine or especially ditallamine. A particularly preferred component (K4) is the reaction product of 1 mol of ethylenediaminetetraacetic acid and 4 mol of hydrogenated ditallamine.

Further typical examples of component (K4) include the N,N-dialkylammonium salts of 2-N',N'-dialkylamidobenzoates, for example the reaction product of 1 mol of phthalic anhydride and 2 mol of ditallamine, the latter being hydrogenated or unhydrogenated, and the reaction product of 1 mol of an alkenylspirobislactone with 2 mol of a dialkylamine, for example ditallamine and/or tallamine, the latter two being hydrogenated or unhydrogenated.

Further typical structure types for the component of class (K4) are cyclic compounds with tertiary amino groups or condensates of long-chain primary or secondary amines with carboxylic acid-containing polymers, as described in WO 93/18115.

Sulfocarboxylic acids, sulfonic acids or derivatives thereof which are suitable as cold flow improvers of the component of class (K5) are, for example, the oil-soluble carboxamides and carboxylic esters of ortho-sulfobenzoic acid, in which the sulfonic acid function is present as a sulfonate with alkyl-substituted ammonium cations, as described in EP-A 261 957.

Poly(meth)acrylic esters suitable as cold flow improvers of the component of class (K6) are either homo- or copolymers of acrylic and methacrylic esters. Preference is given to copolymers of at least two different (meth)acrylic esters which differ with regard to the esterified alcohol. The copolymer optionally comprises another different olefinically unsaturated monomer in copolymerized form. The weight-average molecular weight of the polymer is preferably 50 000 to 500 000. A particularly preferred polymer is a copolymer of methacrylic acid and methacrylic esters of saturated $C_{14}$- and $C_{15}$-alcohols, the acid groups having been neutralized with hydrogenated tallamine. Suitable poly(meth)acrylic esters are described, for example, in WO 00/44857.

The cold flow improver or the mixture of different cold flow improvers is added to the middle distillate fuel or diesel fuel in a total amount of preferably 10 to 5000 ppm by weight, more preferably of 20 to 2000 ppm by weight, even more preferably of 50 to 1000 ppm by weight and especially of 100 to 700 ppm by weight, for example of 200 to 500 ppm by weight.

B4) Lubricity Improvers

Suitable lubricity improvers or friction modifiers are based typically on fatty acids or fatty acid esters. Typical examples are tall oil fatty acid, as described, for example, in WO 98/004656, and glyceryl monooleate. The reaction products, described in U.S. Pat. No. 6,743,266 B2, of natural or synthetic oils, for example triglycerides, and alkanolamines are also suitable as such lubricity improvers.

B5) Corrosion Inhibitors Other than the Described Reaction Products of Polyisobutene that Bear Free Acid Groups Suitable corrosion inhibitors are, for example, succinic esters, in particular with polyols, fatty acid derivatives, for example oleic esters, oligomerized fatty acids, substituted ethanolamines, and products sold under the trade name RC 4801 (Rhein Chemie Mannheim, Germany), Irgacor® L12 (BASF SE) or HiTEC 536 (Ethyl Corporation).

B6) Demulsifiers

Suitable demulsifiers are, for example, the alkali metal or alkaline earth metal salts of alkyl-substituted phenol- and naphthalenesulfonates and the alkali metal or alkaline earth metal salts of fatty acids, and also neutral compounds such as alcohol alkoxylates, e.g. alcohol ethoxylates, phenol alkoxylates, e.g. tert-butylphenol ethoxylate or tert-pentylphenol ethoxylate, fatty acids, alkylphenols, condensation products of ethylene oxide (EO) and propylene oxide (PO), for example including in the form of EO/PO block copolymers, polyethyleneimines or else polysiloxanes.

87) Dehazers

Suitable dehazers are, for example, alkoxylated phenolformaldehyde condensates, for example the products available under the trade name NALCO 7D07 (Nalco) and TOLAD 2683 (Petrolite).

B8) Antifoams

Suitable antifoams are, for example, polyether-modified polysiloxanes, for example the products available under the trade name TEGOPREN 5851 (Goldschmidt), Q 25907 (Dow Corning) and RHODOSIL (Rhone Poulenc).

B9) Cetane Number Improvers

Suitable cetane number improvers are, for example, aliphatic nitrates such as 2-ethylhexyl nitrate and cyclohexyl nitrate and peroxides such as di-tert-butyl peroxide.

B10) Antioxidants

Suitable antioxidants are, for example, substituted phenols, such as 2,6-di-tert-butylphenol and 6-di-tert-butyl-3-methylphenol, and also phenylenediamines such as N,N'-di-sec-butyl-p-phenylenediamine.

B11) Metal Deactivators

Suitable metal deactivators are, for example, salicylic acid derivatives such as N,N'-disalicylidene-1,2-propanediamine.

B12) Solvents

Suitable solvents are, for example, nonpolar organic solvents such as aromatic and aliphatic hydrocarbons, for example toluene, xylenes, white spirit and products sold under the trade name SHELLSOL (Royal Dutch/Shell Group) and EXXSOL (ExxonMobil), and also polar organic solvents, for example, alcohols such as 2-ethylhexanol, decanol and isotridecanol. Such solvents are usually added to the diesel fuel together with the aforementioned additives and coadditives, which they are intended to dissolve or dilute for better handling.

C) Fuels

The inventive use relates in principle to any fuels, preferably diesel fuels and gasoline fuels.

Middle distillate fuels such as diesel fuels or heating oils are preferably mineral oil raffinates which typically have a boiling range from 100 to 400° C. These are usually distillates having a 95% point up to 360° C. or even higher. These may also be what is called "ultra low sulfur diesel" or "city diesel", characterized by a 95% point of, for example, not more than 345° C. and a sulfur content of not more than 0.005% by weight or by a 95% point of, for example, 285° C. and a sulfur content of not more than 0.001% by weight. In addition to the mineral middle distillate fuels or diesel fuels obtainable by refining, those obtainable by coal gasification or gas liquefaction ["gas to liquid" (GTL) fuels] or by biomass liquefaction ["biomass to liquid" (BTL) fuels] are also suitable. Also suitable are mixtures of the aforementioned middle distillate fuels or diesel fuels with renewable fuels, such as biodiesel or bioethanol.

The qualities of the heating oils and diesel fuels are laid down in detail, for example, in DIN 51603 and EN 590 (cf. also Ullmann's Encyclopedia of Industrial Chemistry, 5th edition, Volume A12, p. 617 ff.).

The inventive use in middle distillate fuels of fossil, vegetable or animal origin, which are essentially hydrocarbon mixtures, also relates to mixtures of such middle distillates with biofuel oils (biodiesel). Mixtures of this kind are encompassed by the term "middle distillate fuel". They are commercially available and usually comprise the biofuel oils in minor amounts, typically in amounts of 1 to 30% by weight, especially of 3 to 10% by weight, based on the total amount of middle distillate of fossil, vegetable or animal origin and biofuel oil.

Biofuel oils are generally based on fatty acid esters, preferably essentially on alkyl esters of fatty acids which derive from vegetable and/or animal oils and/or fats. Alkyl esters are typically understood to mean lower alkyl esters, especially $C_1$- to $C_4$-alkyl esters, which are obtainable by transesterifying the glycerides which occur in vegetable and/or animal oils and/or fats, especially triglycerides, by means of lower alcohols, for example ethanol or in particular methanol ("FAME"). Typical lower alkyl esters based on vegetable and/or animal oils and/or fats, which find use as a biofuel oil or components thereof, are, for example, sunflower methyl ester, palm oil methyl ester ("PME"), soya oil methyl ester ("SME") and especially rapeseed oil methyl ester ("RME").

The middle distillate fuels or diesel fuels are more preferably those having a low sulfur content, i.e. having a sulfur content of less than 0.05% by weight, preferably of less than 0.02% by weight, particularly of less than 0.005% by weight and especially of less than 0.001% by weight of sulfur.

Useful gasoline fuels include all commercial gasoline fuel compositions. One typical representative which shall be mentioned here is the Eurosuper base fuel to EN 228, which is customary on the market. In addition, gasoline fuel compositions of the specification according to WO 00/47698 are also possible fields of use for the present invention.

The examples which follow are intended to elucidate the present invention without restricting it.

EXAMPLES

GPC Analysis

Unless stated otherwise, the mass-average molecular weight Mw and number-average molecular weight Mn of the polymers was measured by means of gel permeation chromatography (GPC). GPC separation was effected by means of two PLge Mixed B columns (Agilent) in tetrahydrofuran at 35° C. Calibration was effected by means of a narrow-distribution polystyrene standard (from PSS, Germany) having a molecular weight of 162-50 400 Da. Hexylbenzene was used as a marker for low molecular weight.

Synthesis Example 1

524 g (0.54 mol) of a polyisobutene having a number-average molar mass Mn of 1000 g/mol and a content of α-double bonds of 87% were initially charged together with 87 g (0.89 mol) of maleic anhydride in a 1 L autoclave equipped with a stirrer and thermometer. The mixture was converted under nitrogen at 210° C. over the course of 8 hours, in the course of which the pressure rose to 3 bar. The reaction mixture was cooled down to room temperature, transferred to a round-bottom flask with the aid of 1 L of toluene and filtered. Solvent and maleic anhydride were removed on a rotary evaporator at 190° C. at 1 mbar. 580 g of a dark brown, oily and viscous product were obtained.

In order to ascertain the hydrolysis number, the product was dissolved in toluene to give a 50% solution. The hydrolysis number of the product was measured by reaction of 10 mL of the solution obtained with excess potassium hydroxide, followed by back-titration of the potassium hydroxide residue with hydrochloric acid. The hydrolysis number was found to be 120 mg KOH/g.

10 mL of the solution were then eluted through a silica gel column in order to determine the content of unfunctionalized polyisobutene. All the polyisobutene that had reacted with maleic anhydride was retained on the column, and polyisobutene was eluted with hexane. According to this, the reaction mixture comprised 13.4% by weight of unfunctionalized polyisobutene.

According to the above measurements, the reaction mixture comprised, as well as 13.4% by weight of unfunctionalized polyisobutene, monofunctionalized and difunctionalized polyisobutenesuccinic anhydride, which, assuming that no other by-products were present, gives a bismaleation level of 40.3%.

Synthesis Example 2: Hydrolysis of the Polyisobutenesuccinic Anhydride from Synthesis Example 1

101 g of the polyisobutenesuccinic anhydride from synthesis example 1 were dissolved in 100 ml of ethyl methyl ketone in a 500 ml four-neck flask with reflux condenser and thermometer. The orange solution was heated to 50° C. and 50 ml of water were added dropwise over the course of 6 minutes, with the temperature of the mixture being held between 48 and 53° C. The mixture was subsequently heated under reflux at 75-76° C. for 5 hours under reflux. 150 ml of toluene were added to the solution and a water separator with 30 ml of toluene was mounted onto the flask. The mixture was stirred under reflux at 80 to 85° C. for 2 hours, and 48 ml of aqueous phase were removed continuously via the water separator. As soon as further formation of water came to a stop, the mixture was cooled to room temperature and filtered and the solution was concentrated on a rotary evaporator at 80° C. and 1 mbar. This gave 99.9 g of an orange, turbid product with an oily viscosity.

In an analogous manner to synthesis example 1 and 2, by altering the maleic anhydride:polyisobutene stoichiometry, reaction mixtures with a bismaleation level of 10% or 16.9% (17.6% by weight of unfunctionalized polyisobutene) were obtained in synthesis examples 3 and 4, respectively.

Use Examples

Figure 1:
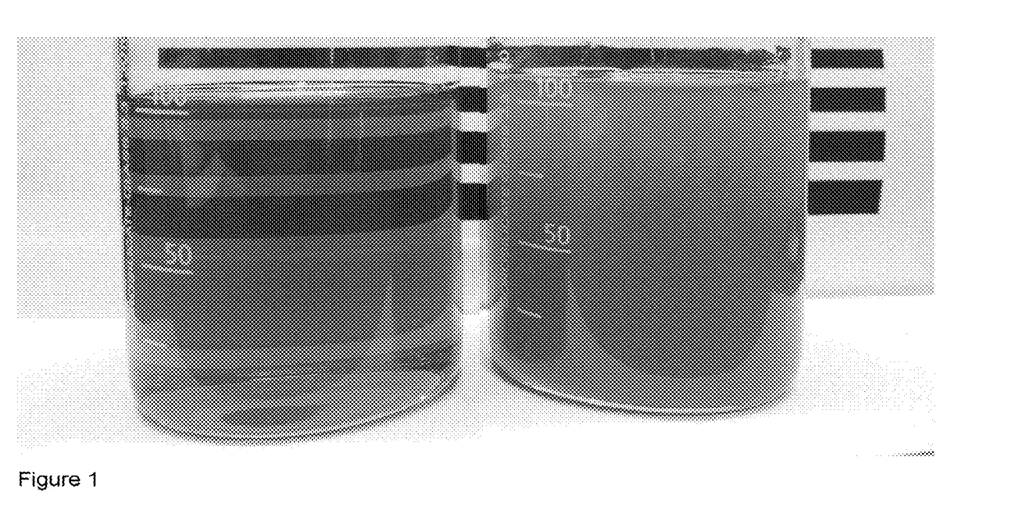
FIG. 1 shows a mixture of Shell Helix® with corrosion inhibitor in the left-hand beaker and a mixture of dimer fatty acid in the right-hand beaker, where turbidity is apparent.

1) Calcium Compatibility Test:

100 mL of motor oil (Shell Helix®, FIG. 1, left-hand beaker, with a Ca content of 1500 ppm, Mg content of 1100 ppm and Zn content of 1300 ppm) were heated to 70° C. in the beaker and then 1 mL of corrosion inhibitor was added. Should the solution still be clear, a further 1 mL of inhibitor is added. If the solution turns cloudy, the test is considered to have been failed (e.g. FIG. 1, right-hand beaker). FIG. 1 shows, in the right-hand beaker, 1 mL of dimer fatty acid (dimeric oleic acid; CAS: 61788-89-4, 40% in Solvent Naphtha) was used. Distinctly visible turbidity is apparent.

Figure 2:
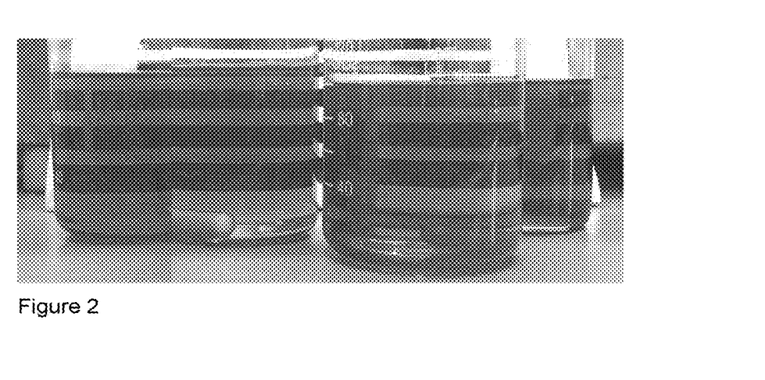
FIG. 2 shows from left to right: pure Shell Helix®, oil admixed with product from synthesis example 4, oil admixed with product from synthesis example 2, and oil admixed with product from synthesis example 3; where all of the products do not result in any turbidity.

FIG. 2 shows, from left to right, the pure Shell Helix®, oil admixed with product from synthesis example 4, oil admixed with product from synthesis example 2, and oil admixed with product from synthesis example 3. It is seen that all of the products do not result in any turbidity.

2) Steel Corrosion Test to ASTM D 665 B (Gasoline)

The fuel used was conventional E0 CEC RF-12-09 gasoline fuel from Haltermann (batch number 1878), which was additized with 490 mg/kg of an additive package composed of polyisobuteneamine and carrier oil (polyether). The corrosion inhibitors specified in the table which follows were added to the formulation in the amounts specified (based on active component) and subjected to a corrosion test to ASTM D 665 B in saltwater.

Dimer fatty acid as corrosion inhibitor (dimeric oleic acid; CAS: 61788-89-4, 40% in Solvent Naphtha) was used as a comparison.

| Formulation | Corrosion inhibitor | Bismaleation level | Dosage [mg/kg] active | Assessment according to NACE |
|---|---|---|---|---|
| E0 base fuel | — | — | — | E |
| Formulation 1** | Dimer fatty acid | — | 5 | B++ |
| Formulation 2** | Synthesis example 2 | 40.3% | 5 | A |
| Formulation 3** | Synthesis example 3 | 10% | 10 | B+ |
| Formulation 4** | Synthesis example 4 | 16.9% | 5 | B+ |

**Polyisobuteneamine-containing base package with polyether carrier oil at 490 mg/kg The assessment was made as follows:
A 100% rust-free
B++ 0.1% or less of the total surface area rusted
B+ 0.1% to 5% of the total surface area rusted
B 5% to 25% of the total surface area rusted
C 25% to 50% of the total surface area rusted
D 50% to 75% of the total surface area rusted
E 75% to 100% of the total surface area rusted

The invention claimed is:

1. A process of reducing corrosion on a surface comprising iron, steel, copper, or a copper alloy, the process comprising:
    contacting the surface with a corrosion inhibitor in the presence of sodium, potassium, magnesium, calcium, and/or zinc ions,
    wherein the corrosion inhibitor comprises a reaction product of polyisobutene comprising free acid groups, the reaction product comprising, in reacted form: (A) a polyisobutene having a number-average molecular weight Mn in a range of from 200 to 10000 and (B) an α,β-unsaturated monomer that is a monocarboxylic acid, dicarboxylic acid, monoalkyl ester, dialkyl ester, or anhydride, in a stoichiometric ratio of more than one equivalent of the α,β-unsaturated monomer (B) per reactive double bond in the polyisobutene (A),
    wherein the reaction product has a bismaleation level in a range of from at least 12% to 40%, and
    wherein, when the monomer (B) comprises the monoalkyl ester and/or the dialkyl ester, at least 10% of the ester groups present in the reaction product are in hydrolyzed form, and/or
    wherein, when the monomer (B) comprises the anhydride, at least 10% of the anhydride groups present in the reaction product are in hydrolyzed form.

2. The process of claim 1, wherein the polyisobutene (A) has a number-average molecular weight $M_n$ of 500 to 2500.

3. The process of claim 1, wherein the monomer (B) is selected from the group consisting of acrylic acid, methacrylic acid, crotonic acid, ethylacrylic acid and derivatives thereof.

4. The process of claim 1, wherein the monomer (B) is selected from the group consisting of maleic acid, fumaric acid, itaconic acid (2-methylenebutanedioic acid), citraconic acid (2-methylmaleic acid), glutaconic acid (pent-2-ene-1, 5-dicarboxylic acid), 2,3-dimethylmaleic acid, 2-methylfumaric acid, 2,3-dimethylfumaric acid, methylenemalonic acid, tetrahydrophthalic acid, and derivatives thereof.

5. The process of claim 1, wherein the monomer (B) is maleic anhydride.

6. The process of claim 1, wherein the bismaleation level is at least 11%.

7. The process of claim 1, wherein a proportion of unconverted polyisobutene in the reaction product is not more than 30% by weight.

8. The process of claim 1, wherein the corrosion inhibitor is comprised in a gasoline fuel having a sodium content, a potassium content, or both, of at least 0.1 ppm by weight.

9. The process of claim 1, wherein the corrosion inhibitor is comprised in a gasoline fuel having a magnesium content, a calcium content, or both, of at least 0.1 ppm by weight.

10. The process of claim 1, wherein the corrosion inhibitor is comprised in a gasoline fuel having a zinc content of at least 0.1 ppm by weight.

11. The process of claim 1, wherein the reducing of corrosion comprises preventing and reducing deposits in a fuel system.

12. The process of claim 1, wherein the bismaleation level is at least 15%.

13. The process of claim 1, wherein the bismaleation level is up to 35%.

14. The process of claim 1, wherein the bismaleation level is up to 30%.

15. The process of claim 1, wherein the polyisobutene (A) has a number-average molecular weight Mn of 700 to 2500.

16. The process of claim 1, wherein the polyisobutene (A) has a number-average molecular weight Mn up to 1100.

17. The process of claim 1, wherein the compound (B) comprises acrylic acid and/or methacrylic acid.

18. The process of claim 1, wherein the compound (B) comprises crotonic acid and/or ethylacrylic acid.

* * * * *